(12) United States Patent
Engström et al.

(10) Patent No.: US 8,891,488 B2
(45) Date of Patent: Nov. 18, 2014

(54) INTER-BASE-STATION INTERFACE ENHANCEMENT FOR MULTI-OPERATOR CORE NETWORKS

(75) Inventors: Stefan Engström, Linköping (SE); Peter Werner, Linköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 77 days.

(21) Appl. No.: 13/698,250

(22) PCT Filed: May 19, 2010

(86) PCT No.: PCT/SE2010/050544
§ 371 (c)(1),
(2), (4) Date: Nov. 15, 2012

(87) PCT Pub. No.: WO2011/145988
PCT Pub. Date: Nov. 24, 2011

(65) Prior Publication Data
US 2013/0058313 A1    Mar. 7, 2013

(51) Int. Cl.
*H04W 36/00* (2009.01)
*H04W 24/04* (2009.01)
*H04W 8/30* (2009.01)
*H04W 24/08* (2009.01)
*H04W 92/20* (2009.01)

(52) U.S. Cl.
CPC .......... *H04W 24/04* (2013.01); *H04W 36/0083* (2013.01); *H04W 8/30* (2013.01); *H04W 24/08* (2013.01); *H04W 92/20* (2013.01)
USPC .......................................... 370/331; 455/439

(58) Field of Classification Search
USPC .................... 370/329, 331–334; 455/436–440
See application file for complete search history.

(56) References Cited

U.S. PATENT DOCUMENTS

| 7,155,223 | B2 * | 12/2006 | O'Brien ........................ 455/436 |
| 2003/0190916 | A1 * | 10/2003 | Celedon et al. ............... 455/437 |
| 2004/0157600 | A1 * | 8/2004 | Stumpert et al. ........... 455/432.1 |
| 2006/0172741 | A1 * | 8/2006 | Jeong et al. .................... 455/446 |
| 2009/0061877 | A1 * | 3/2009 | Gallagher et al. ............ 455/436 |
| 2010/0075681 | A1 |   3/2010 | Olofsson et al. |

FOREIGN PATENT DOCUMENTS

WO    2006101426 A1    9/2006

OTHER PUBLICATIONS

3GPP. "Technical Specification Group Services and System Aspects." 3GPP TS 23.251 v9.2.0. Mar. 2010.

(Continued)

*Primary Examiner* — Kerri Rose
(74) *Attorney, Agent, or Firm* — Coats & Bennett, P.L.L.C.

(57) ABSTRACT

In one aspect, the teachings herein provide an enhanced inter-base-station interface and associated processing in which a base station receives a message from a neighboring base station that zero served PLMNs are available in a neighboring cell. In response to receiving that message, the base station removes the neighboring cell from its neighbor list, or otherwise marks the neighboring cell as unavailable, but advantageously does not discard any network performance data accumulated or otherwise generated for that neighboring cell. Correspondingly, should the base station receive a subsequent message indicating that one or more served PLMNs have become available in the neighboring cell, it restores the neighboring cell to its neighbor list and reinstates links or associations, as needed, to the retained network performance data.

14 Claims, 4 Drawing Sheets

(56) References Cited

OTHER PUBLICATIONS

Feng et al., "Self-Organizing Networks (SON) in 3GPP Long Term Evolution." May 20, 2008. Nomor Research GmbH. Munich, Germany.

3G Americas. "The Benefits of SON in LTE, Self-Optimizing and Self-Organizing Networks." Dec. 2009. http://www.3gamericas.org/documents/2009_%203GA_LTE_SON_white_paper_12_15_09_Final.pdf.

3rd Generation Partnership Project. "3rd Generation Partnership Project; Technical Specification Group Radio Access Network; Evolved Universal Terrestrial Radio Access Network (E-UTRAN); X2 application protocol (X2AP) (Release 8)." 3GPP TS 36.423, V8.7.0, Sep. 2009, Sophia Antipolis Valbonne, France, pp. 1-100.

* cited by examiner

INTER-BASE-STATION INTERFACE ENHANCEMENT FOR MULTI-OPERATOR CORE NETWORKS

TECHNICAL FIELD

The present invention generally relates to wireless communication networks, and particularly relates to base-station interface enhancements in multi-operator networks, such as where two or more operators share the same Radio Access Network (RAN).

BACKGROUND

The Third Generation Partnership Project (3GPP) Technical Specification (TS) 36.423 details the "X2" interface, used between radio base stations in Evolved Terrestrial Radio Access Networks (EUTRAN). A base station in the EUTRAN context is termed an "eNB" or "eNodeB." Among other uses, the X2 interface provides for the distribution of own-cell configuration data to neighboring eNBs.

For each cell, the cell's own "served" Public Land Mobile Networks or PLMNs are signaled to the neighboring cells. In other words, a given radio cell may provide access to more than one PLMN, and each such PLMN may be associated with a different network operator. Often, within the multi-operator scenario, a given RAN cell supports two or more core networks, where each network is associated with a different operator.

However, even where a given cell is associated with multiple core networks, at any given time not all such networks may be available for serving user equipment (UE). As one example, communication with the Mobility Management Entity (MME) or other element in an associated core network may be lost, at least temporarily. Or, some functionality within a given core network may be temporarily impaired. In such cases, the PLMN associated with that network is considered unavailable for serving UEs (e.g., mobile terminals and other communication devices).

When a served PLMN is lost at a given cell, the PLMN is removed from the system information broadcast (SIB) transmitted by the cell, to prevent UEs associated with that PLMN from attempting to camp in the cell. The loss is also indicated to neighboring cells over the X2 interface, such as by removing the IDs of unavailable PLMNs from the cell information update messages that are sent between eNBs. Making the loss visible to neighboring cells prevents, for example, those neighboring cells from attempting (prepared or blind) handover of UEs into the cell, for PLMNs that are unavailable in the cell.

As a general proposition, each cell maintains some form of neighbor list information, such as one or more tables or other data structures, including entries for each neighboring cell, its ID, and the IDs of the served PLMNs that are available in the neighboring cell. The cell also maintains certain performance data, such as handover performance data that indicates in one sense or another handover performance from or to the neighboring cell. Additionally, or alternatively, the same or other performance data may be maintained in an operations and maintenance node, which may store a listing of associated cells and, for each such cell, neighboring cell data. When the last served PLMN available in a given cell is lost, that cell is removed from neighbor cell listings in the surrounding cells, as it no longer offers any served PLMNs for use by UEs. Commonly, when a cell is removed from the neighbor list in a given base station, that base station also removes performance or other data that is specific to the removed cell. Further, such cell data deletions may be propagated to operations and maintenance (O&M) entities.

SUMMARY

In one aspect, the teachings herein provide an enhanced inter-base-station interface and associated processing in which a base station receives a message from a neighboring base station that zero served PLMNs are available in a neighboring cell. In response to receiving that message, the base station removes the neighboring cell from its neighbor list, or otherwise marks the neighboring cell as unavailable, but advantageously does not discard any network performance data accumulated or otherwise generated for that neighboring cell. Correspondingly, should the base station receive a subsequent message indicating that one or more served PLMNs have become available in the neighboring cell, it restores the neighboring cell to its neighbor list and reinstates links or associations, as needed, to the retained network performance data.

Thus, in one embodiment the present invention comprises a method of maintaining external cell information for a first cell with respect to one or more neighboring cells. The method includes maintaining network performance data for the neighboring cells reflecting historic or expected handover performance for the neighboring cells with respect to the first cell. In more detail, the method includes maintaining a cell list of those neighboring cells that are available for handover based on receiving a cell information message from each such neighboring cell that indicates the neighboring cell has at least one served PLMN available. The method further includes removing a given neighboring cell from the cell list, or otherwise marking it as unavailable, in response to receiving a cell information message from the given neighboring cell that indicates that no served PLMNs currently are available in the neighboring cell, while retaining the network performance data for the given neighboring cell. The performance data is retained for use in the case that one or more served PLMNs once again become available in the given neighboring cell.

The above method is implemented in a wireless communication network node, for example. In one embodiment, the node includes one or more processing circuits that are configured, e.g., programmatically configured, to carry out the method. The wireless communication network node comprises an eNodeB in an LTE example, wherein neighboring eNodeBs exchange messages over their X2 interfaces, indicating the availability (or lack thereof) of served PLMNs in their corresponding cells.

In another embodiment, the present invention comprises a method of indicating the loss of served Public Land Mobile Network (PLMN) availability for a given cell in a wireless communication network. The method includes detecting that no served PLMNs are available for use in providing service in the given cell, and correspondingly setting an indicator value to zero, or another value logically deemed to be zero, in response to detecting that no served PLMNs currently are available for providing service in the given cell. Further, the method includes sending a cell information message to a neighboring cell, where the cell information message conveys the indicator value, to inform the neighboring cell that the given cell currently has no served PLMNs available. In an LTE example, one eNodeB would form such a message, e.g., in response to detecting the loss of the last available served PLMN in its cell, and send a cell information update message over its X2 interface with a neighboring eNodeB. That message would include a served PLMN indicator (e.g., a count value), indicating that zero served PLMNs are available in the cell, thus allowing the neighboring eNodeB to remove the cell at least temporarily from its neighbor list as a handover target, etc.

The method immediately above is implemented, for example, in a wireless communication node configured for use in a wireless communication network. The node is configured to indicate the loss of served PLMN availability for a given cell in the wireless communication network, based on including one or more processing circuits that are configured to detect that no served PLMNs are available for use in providing service in the given cell, and set an indicator value to zero, or another value logically deemed to be zero, in response to detecting that no served PLMNs currently are available for providing service in the given cell. Further, the node is configured to send a cell information message to a neighboring cell, said cell information message conveying said indicator value, to inform the neighboring cell that the given cell currently has no served PLMNs available.

DETAILED DESCRIPTION

Figure 1:
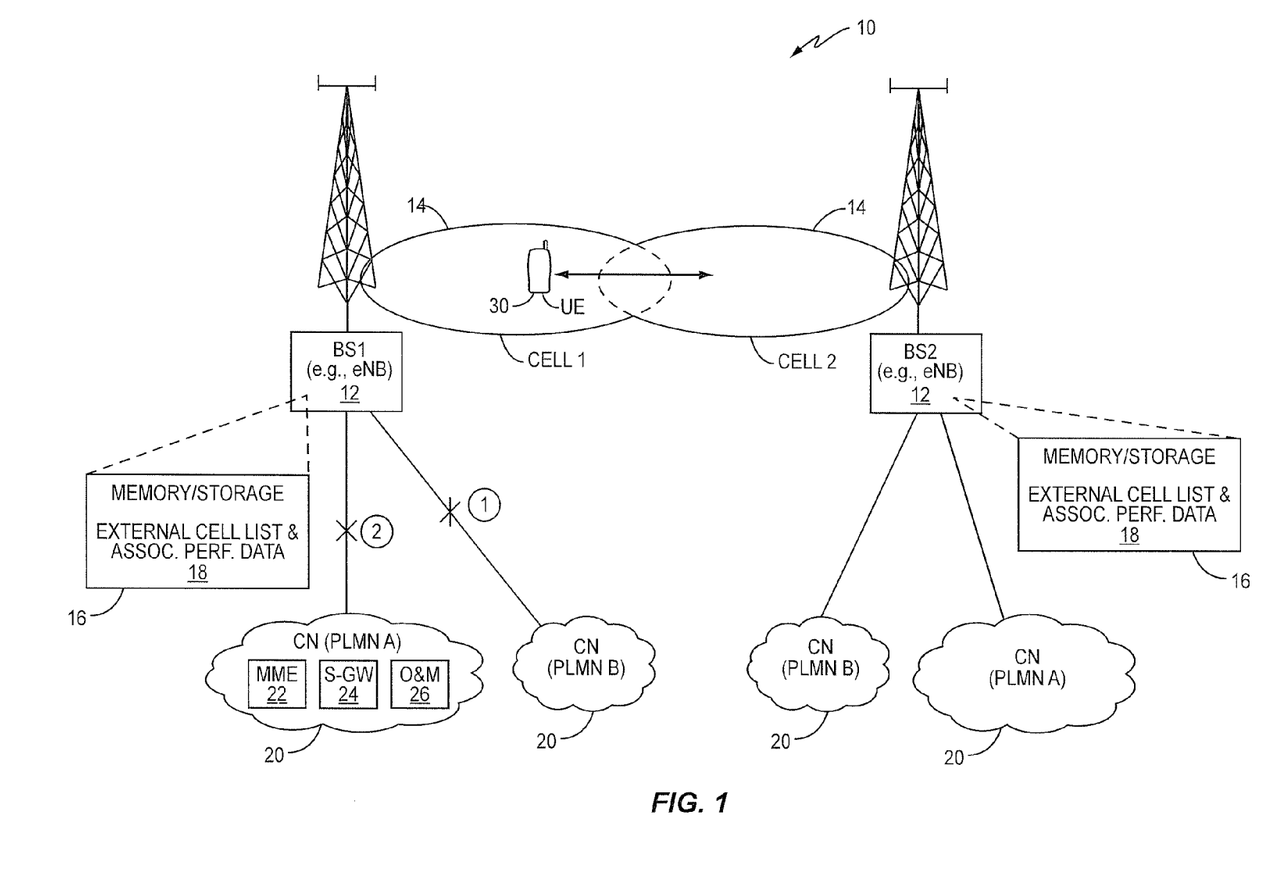
FIG. 1 is a block diagram of one embodiment of a wireless communication network, which includes base stations configured according to one or more embodiments of the present invention.

FIG. 1 is a block diagram of one embodiment of a wireless communication network 10, including neighboring base stations 12, denoted as "BS 1" and "BS 2." Each base station 12 has an associated cell 14, denoted as "Cell 1" for BS 1, and as "Cell 2" for "BS 2." In this context, each base station 12 includes memory 16 (which may be one or more types of computer memory and/or disc storage), for storing an external cell list and associated performance data 18, which is referred to as "data 18," or "list 18" for ease of discussion. The data 18 includes neighbor cell information, such as a listing by cell ID, of all neighboring cells, along with further data, such as IDs of the served PLMNs that are available in each neighboring cell 14, and "performance" data, such as historic or accumulated data regarding call handover performance to or from each neighboring cell 14.

Each base station 12 constitutes a portion of one or more Radio Access Networks (RANs), and it will be understood in the art that multiple network operators (service providers) can share one or more of the base stations 12. By way of example, BS 1 is shown as communicatively coupled to two Core Networks (CNs) 20. One CN 20 is denoted as "PLMN A" and the other one is denoted as "PLMN B." (While BS 2 is also shown communicatively coupled to the same PLMNs A and B, it is not necessary for all neighboring cells 14 to share all PLMNs in common.)

For further example details, one sees that the CN 20 of PLMN A includes a Mobility Management Entity (MME) 22, and a Serving Gateway (S-GW) node 24. The other CNs 20 generally include similar equipment, along with potentially many other types of nodes or entities, although such details are not needed for understanding the present invention and are therefore not illustrated. Each BS 12 also may be connected to a respective Operations & Maintenance (O&M) node 26.

It may be that the number of served PLMNs available in Cell 1 or Cell 2 changes, at least on a temporary basis, because of communication link or equipment failures, or because of other dynamic conditions. FIG. 1 attempts to illustrate this case with the circled numerals "1" and "2," which are shown adjacent to the links between BS 1 and PLMN B and PLMN A, respectively. At some time, "T 1" denoted by the circled 1, PLMN B becomes unavailable for serving UEs 30 in Cell 1. (FIG. 1 depicts one UE 30 as an example, where UE 30 is shown moving toward or from an overlapping boundary region of Cells 1 and 2—i.e., where inter-cell handover generally would occur.) At some later time, "T 2" as denoted by the circled 2, PLMN A also becomes unavailable for serving UEs 30 in Cell 1. At that point, at least temporarily, no served PLMNs are available in Cell 1 and Cell 1 is therefore unavailable for use by Cell 2 as handover target.

Figure 2:
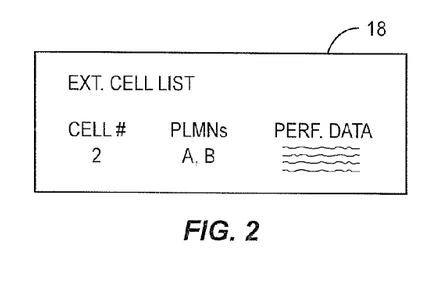
FIGS. 2-6 are example diagrams of external cell information lists, such as may be maintained at base stations and/or operations and maintenance nodes, according to one or more embodiments of the present invention.

FIG. 2 depicts an example of the list 18 as maintained in BS 1 with respect to neighboring Cell 2. One sees a table-like data structure, showing an entry for Cell 2 (by cell ID or other #), and associated data indicating the served PLMNs available in Cell 2 (here PLMN A and PLMN B). The list 18 also includes network performance data, preferably for each neighboring cell 14. For each such neighboring cell 14, the network performance data comprises, for example, one or more data items or metrics reflecting historic handover performance, e.g., metrics indicating handover reliability, handover triggering thresholds, etc., associated with Cell 2, taken with respect to Cell 1.

Figure 3:
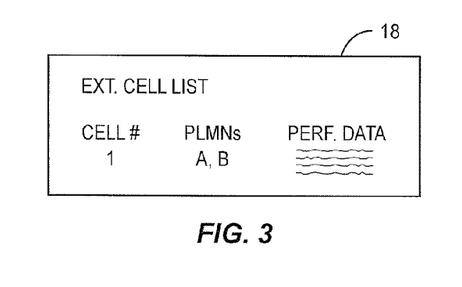
Figures 4, 6:
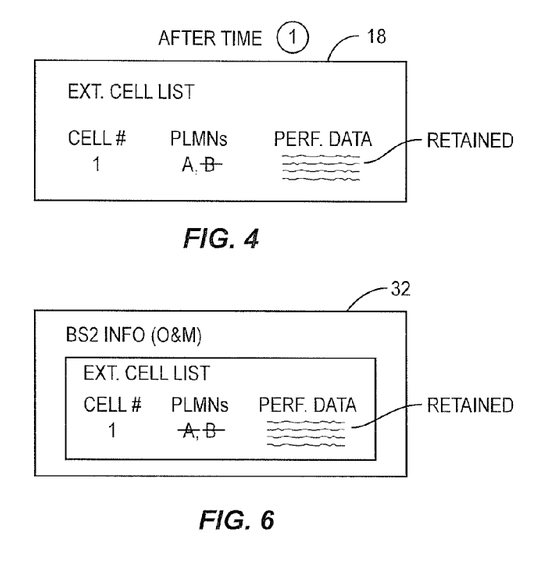
Figure 5:
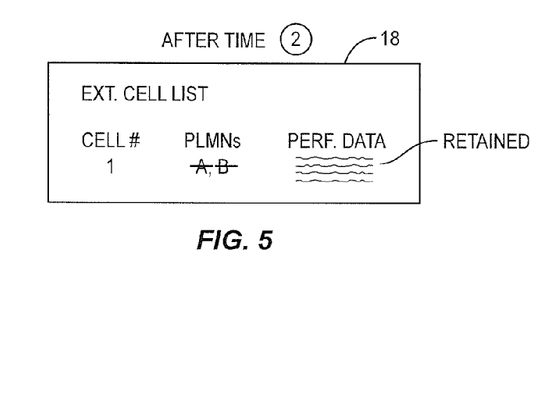

Correspondingly, in FIGS. 3-5, one sees a similar list 18, as maintained in BS 2 for Cell 2 with respect to Cell 1. In particular, FIG. 3 depicts the list 18 in BS 2 at a time before T 1. Thus, one sees that both PLMN A and B are indicated as being available in the list entry corresponding to Cell 1. In FIG. 4, one sees the list 18 as updated in BS 2 after time T 1. For example, Cell 1 loses its communication link with PLMN B at time T 1, and in response BS 1 sends a cell information update message to BS 2, indicating that PLMN B is not available.

Accordingly, BS 2 strikes PLMN B from its list 18 (either deletes it outright, or marks it as unavailable, as regards Cell 1). However, BS 2 advantageously retains the performance data for both PLMN A and PLMN B, relating Cell 2 to Cell 1, in case the loss of PLMN B is temporary. That is, rather than delete all information from its list 18 for PLMN B, for Cell 1 upon receiving an indication that PLMN B is unavailable in Cell 1, BS 2 advantageously retains such data, in case service via PLMN B is restored within Cell 1. Of course, an O&M node 26 of other entity may communicate with BS 2, and provide for permanent removal of such performance data, in cases where it is desirable to permanently delete such data.

Continuing, FIG. 5 depicts the same list 18 in BS 2, but updated after time T 2, where connectivity to PLMN A in Cell 1 has been lost. Now, as is indicated by the strikethroughs in the PLMN entries for Cell 1 in the list 18, BS 2 has deleted both PLMN A and PLMN B from its listing of served PLMNs available for use in Cell 1 (or has otherwise marked them as unavailable), but has retained network performance data for both such PLMNs, with respect to Cell 1. Again, if PLMN A or B, or both, become available in Cell 1 again, then BS 2 can begin using such performance data again, e.g., in making handover decisions with respect to Cell 1, for PLMN A or B.

Further, one sees in FIG. 6 that such data retention methods also can be advantageously used in one or more O&A nodes 26. That is, an O&A node 26 may retain neighbor list information 32 for each cell 14 that is associated the O&A node 26. That is, the O&M node 26 is associated with a number of cells 14, and each such cell 14 has associated with it a list 18 of neighbor cell information and corresponding performance data. Thus, the O&M node 26 may further retain performance data for each such cell that appears in one or more of those neighbor lists, even where no served PLMNs are currently available in such a cell, so that such data is still available if service with at least one PLMN is restored for that cell. Of course, the O&M node 26 is configured in one or more embodiments to provide for permanent removal of performance data relating particular cells, in cases where permanent deletion is desired.

Figures 7, 8:
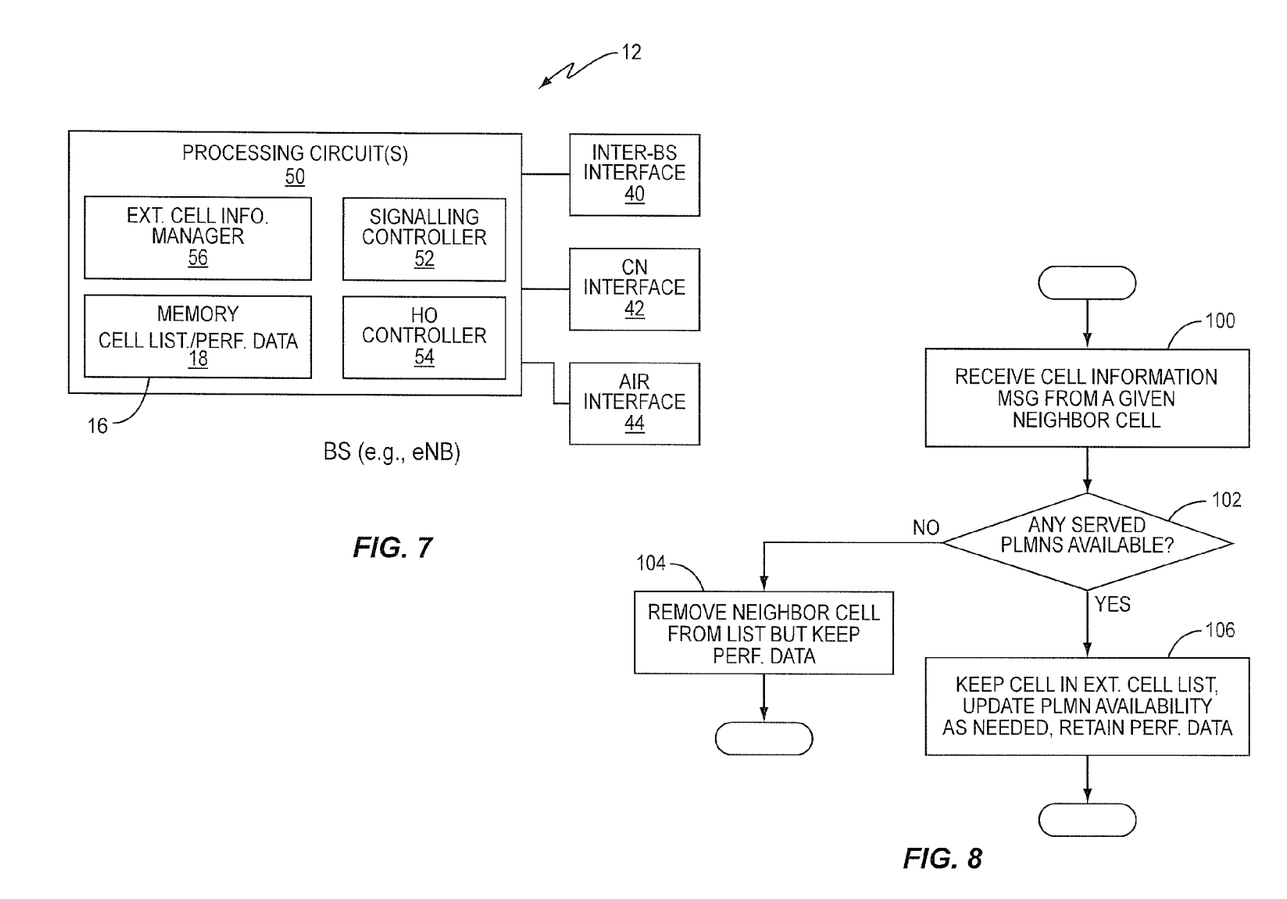
FIG. 7 is a block diagram of a base station and its associated interface and processing circuits, as configured according to an example embodiment of the present invention.
FIG. 8 is a logic flow diagram of a method according to one embodiment of the present invention, such as may be implemented by the base station of FIG. 7.

Turning back to base station details, FIG. 7 depicts an example base station 12, which may be BS 1 and/or BS 2. (In one embodiment, the base station 12 is an eNodeB for use in an LTE network.) With the illustrated base station 12, one sees an inter-base station interface 40, a CN interface 42, and an air interface 44 included within the illustrated base station 12. Further, the base station 12 includes one or more processing circuits 50, that (at least functionally) include a signaling controller 52, a handover controller 54, and an external cell information manager 56, along with the memory 16/list 18 first illustrated in FIG. 1.

In an LTE embodiment, the inter-base station interface 40 comprises an X2 interface and, in general, the inter-base-station interface 40 comprises circuitry that implements the physical layer signaling, along with the logical processing associated with protocol implementation, message processing, etc., for communicating with neighboring base stations 12 Similarly, the CN interface 42 comprises circuitry that implements the physical layer signaling, along with the logical processing associated with protocol implementation, message processing, etc., for communicating with one or more core network entities.

Further, the air interface 44 comprises circuitry that implements the physical layer signaling, along with the logical processing associated with protocol implementation, message processing, etc., for communicating with UEs 30. In particular, those skilled in the art will recognize that the air interface 44 includes RF transceiver circuitry, for wirelessly transmitting to and receiving from a plurality of UEs 30.

Continuing, the signaling controller 52 manages communications (protocol processing, etc.) for one or more of the communication interfaces, e.g., the inter-base-station interface 40. For example, the signaling controller 52 may communicate with the external cell information manager 56, responsive to inter-base station signaling, with the external cell information manager 56 updating its list 18 in memory 16, responsive to such communications. In turn, that information, e.g., the performance data included in the list 18, may be used by the handover controller 54, for directing or otherwise controlling handover of UEs 30 to or from the cell(s) associated with the base station 12.

More broadly, the illustrated base station 12 can be understood as an example illustration of a wireless communication network node as taught in one embodiment herein. Such a node is configured to maintain external cell information for a first cell 14 with respect to one or more neighboring cells 14, and to maintain network performance data for the neighboring cells 14 reflecting historic or expected handover performance for the neighboring cells 14 with respect to the first cell 14. The node includes one or more processing circuits (e.g., processing circuit(s) 50) that are configured to maintain a cell list 18 of those neighboring cells 14 that are available for handover based on receiving a cell information message from each such neighboring cell 14 that indicates the neighboring cell has at least one served PLMN available. The processing circuits are also configured to remove a given neighboring cell 14 from the cell list 18, or otherwise mark it as unavailable, in response to receiving a cell information message from the given neighboring cell 14 that indicates that no served PLMNs currently are available in the neighboring cell 14, while retaining the network performance data for the given neighboring cell 14, for use in the case that one or more served PLMNs once again become available in the given neighboring cell 14.

In one such embodiment, the one or more processing circuits are configured to detect that no served PLMNs are available in the given neighboring cell 14, based on processing one or more information elements included in the cell information message.

In the same or another embodiment, the node comprises a first eNodeB for use in an LTE network, where the first and one or more neighboring cells are cells in the LTE network. In this embodiment, the node is configured to detect that no served PLMNs are available in the given neighboring cell 14, based on receiving a cell data update message over an X2 interface between the first eNodeB and a second eNodeB (which is associated with the given neighboring cell), and detecting that the number of Broadcast PLMNs indicated in the cell data update message is zero. In at least one such embodiment, the first eNodeB is configured to detect that one or more served PLMNs have become available again in the given neighboring cell 14, based on receiving a later cell data update message over the X2 interface, and detecting that the number of broadcast PLMNs indicated in the later cell data update message is greater than zero.

FIG. 8 illustrates a corresponding example method of maintaining external cell information for a first cell 14 with respect to one or more neighboring cells 14. The method includes maintaining network performance data for the neighboring cells 14, reflecting historic or expected handover performance for the neighboring cells 14 with respect to the first cell 14. In particular, the method includes maintaining a cell list 18 of those neighboring cells 14 that are available for handover based on receiving a cell information message from each such neighboring cell 14 that indicates the number (and ID) of served PLMNs available in the neighboring cell 14. That is, a given base station 12 may receive multiple cell information messages from a given neighboring base station 12, for a given neighboring cell 14, with each such message indicating the number (and IDs) of served PLMNs that currently are available in the neighboring cell 14. In response, the receiving base station 12 processes each such cell information message and updates its list 18 accordingly.

In particular, the base station 12 or other node maintains a cell list of those neighboring cells that are available for handover based on receiving a cell information message from each such neighboring cell that indicates the neighboring cell has at least one served PLMN available. At some later time, the base station 12 receives a cell information message from a given one of the neighboring cells 14 (Step 100), and it processes that message to determine whether there are any served PLMNs available in the reporting cell 14. If not ("NO" from Step 102), the base station 12 removes the neighbor cell 14 from the cell list 18, or otherwise marks it as unavailable.

However, as noted, the base station 12 continues maintaining performance data for the neighboring cell 14 (Step 104). On the other hand, if the cell information message indicates that at least one served PLMN is still available in the reporting cell 14, the base station 12 keeps the reporting cell in its list 18 (Step 106).

Figure 9:
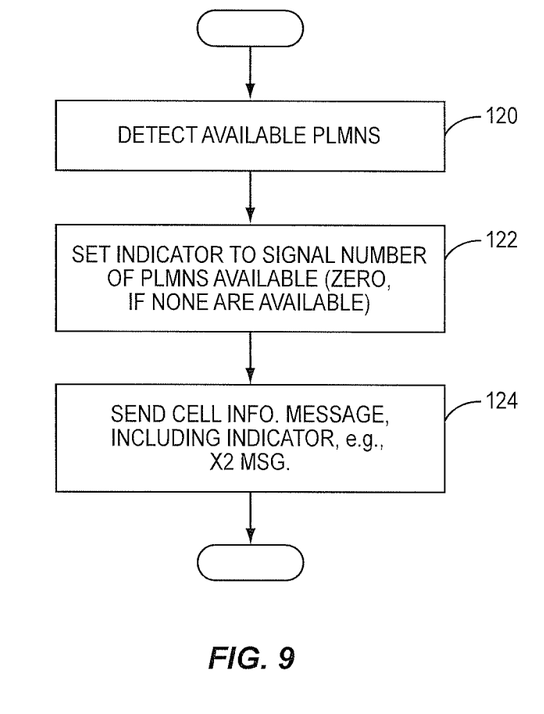
FIG. 9 is a logic flow diagram of a method according to another embodiment of the present invention, such as may be implemented by the base station of FIG. 7.

As for the reporting cell—i.e., the neighboring cell that generates and sends such cell information messages—FIG. 9 illustrates a method of indicating the loss of served PLMN availability for a given cell in a wireless communication network. The method includes detecting that no served PLMNs are available for use in providing service in the given cell 14 (Step 120). The method further includes setting an indicator value to zero, or another value logically deemed to be zero, in response to detecting that no served PLMNs currently are available for providing service in the given cell 14 (Step 122), and sending a cell information message to a neighboring cell 14, said cell information message conveying said indicator value, to inform the neighboring cell 14 that the given cell 14 currently has no served PLMNs available (Step 124).

In at least one embodiment, the above "setting" step comprises an eNodeB associated with the given cell setting a broadcast PLMN information element (IE) in a cell data update message. Correspondingly, the "sending" step comprises the eNodeB transmitting the cell data update message over an X2 interface, to another eNodeB associated with the neighboring cell.

In the same or another embodiment, the method includes detecting that at least one served PLMN has become available for use in providing service in the given cell 14, after a time during which no served PLMNs were available for such use. In response to such detection, the method includes setting the indicator to a non-zero value, or another value logically deemed to be non-zero, in response to said detecting served PLMN availability, and sending another cell information message to the neighboring cell, said another cell information message conveying said indicator value, to inform the neighboring cell that the given cell currently has one or more served PLMNs available.

Implementing the above method or variations of it in the LTE context can be done, at least in part, by modifying the served cell information, as specified in the 3GPP TS 36.423. Namely, the served cell information, such as sent in an inter-cell message over the X2 interface, includes one or more Information Elements (IEs) that can be modified to enable conveying "zero" as the number of available served PLMNs. This is shown in Table 1 below, where the changed parameter(s) are noted via the strikethrough text:

deBs can be informed when a given cell has no served PLMNs currently available in it, so that no HO attempts are made to that given cell with no served PLMNs.

In another embodiment, a wireless communication node is configured to implement the method of FIG. 9. For example, the processing circuits 50 of the base station 12 can be configured, e.g., by way of executing stored computer program instructions, to carry out the method of FIG. 9, in addition to or in alternative to the method of FIG. 8. In this regard, it will be understood that a given base station 12 may perform the operations of FIG. 8 in the context of receiving cell information messages from one or more neighboring base stations 12. Conversely, the given base station may perform the operations of FIG. 9 in the context of detecting PLMN availability in one of its own cells 14, and correspondingly generating and sending cell information messages to neighboring cells, to provide such information to those neighboring cells.

For either or both methods, those skilled in the art will appreciate that in one or more embodiments the processing circuits 50 of FIG. 7 comprise computer processing circuitry, e.g., one or more microprocessors, digital signal processors, ASICs, or other type of digital processing circuit. In this regard, the base station 12 may store computer program instructions, the execution of which configures the processing circuits 50 to carry out the methods illustrated in FIG. 8 and/or FIG. 9.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of maintaining external cell information for a first cell with respect to one or more neighboring cells, said method including maintaining network performance data for the neighboring cells reflecting historic or expected handover performance for the neighboring cells with respect to the first cell, and said method comprising:
    maintaining a cell list of those neighboring cells that are available for handover based on receiving a cell information message from each such neighboring cell that indicates the neighboring cell has at least one served PLMN available; and
    removing a given neighboring cell from the cell list, or otherwise marking it as unavailable, in response to receiving a cell information message from the given neighboring cell that indicates that no served PLMNs

TABLE 1

| IE/Group Name | Presence | Range | IE type and reference | Semantics description | Criticality/ Assigned Criticality |
|---|---|---|---|---|---|
| PCI | M | | INTEGER (0 ... 503, ...) | Physical Cell ID | — |
| Cell ID | M | | ECGI 9.2.14 | | — |
| TAC | M | | OCTET STRING(2) | Tracking Area Code | — |
| Broadcast PLMNs | | ~~1 ... <maxnoofBPLMNs>~~ 0 ... <maxnoofBPLMNs> | | Broadcast PLMNs | — |

With this approach, all external cell data can be kept as needed in neighboring eNodeBs, and those neighboring eNocurrently are available in the neighboring cell, while retaining the network performance data for the given neighboring cell, for use in the case that one or more served PLMNs once again become available in the given neighboring cell.

2. The method of claim 1, further comprising, as part of said removing step, detecting that no served PLMNs are available in the given neighboring cell, based on processing one or more information elements included in the cell information message.

3. The method of claim 1, wherein the first and one or more neighboring cells are cells in an LTE network, and wherein the method further comprises, as part of said removing step, detecting that no served PLMNs are available in the given neighboring cell, based on receiving a cell data update message over an X2 interface between a first eNodeB associated with the first cell and a second eNodeB associated with the given neighboring cell, and detecting that the number of Broadcast PLMNs indicated in the cell data update message is zero.

4. The method of claim 3, further comprising subsequently detecting that one or more served PLMNs have become available in the given neighboring cell by receiving a later cell data update message over the X2 interface, and detecting that the number of broadcast PLMNs indicated in the later cell data update message is greater than zero.

5. A wireless communication network node configured to maintain external cell information for a first cell with respect to one or more neighboring cells, and to maintain network performance data for the neighboring cells reflecting historic or expected handover performance for the neighboring cells with respect to the first cell, said node comprising one or more processing circuits that are configured to:
maintain a cell list of those neighboring cells that are available for handover based on receiving a cell information message from each such neighboring cell that indicates the neighboring cell has at least one served PLMN available; and
remove a given neighboring cell from the cell list, or otherwise mark it as unavailable, in response to receiving a cell information message from the given neighboring cell that indicates that no served PLMNs currently are available in the neighboring cell, while retaining the network performance data for the given neighboring cell, for use in the case that one or more served PLMNs once again become available in the given neighboring cell.

6. The node of claim 5, wherein said one or more processing circuits are configured to detect that no served PLMNs are available in the given neighboring cell, based on processing one or more information elements included in the cell information message.

7. The node of claim 5, further comprising an eNodeB for use in an LTE network and the first and one or more neighboring cells are cells in the LTE network, and wherein the node is configured to detect that no served PLMNs are available in the given neighboring cell, based on receiving a cell data update message over an X2 interface between the eNodeB and a second eNodeB associated with the given neighboring cell, and detecting that the number of Broadcast PLMNs indicated in the cell data update message is zero.

8. The node of claim 7, wherein the node is configured to detect that one or more served PLMNs have become available again in the given neighboring cell, based on receiving a later cell data update message over the X2 interface, and detecting that the number broadcast PLMNs indicated in the later cell data update message is greater than zero.

9. A method of indicating the loss of served Public Land Mobile Network (PLMN) availability for a given cell in a wireless communication network, said method comprising:
detecting that no served PLMNs are available for use in providing service in the given cell;
setting an indicator value to zero, or another value logically deemed to be zero, in response to detecting that no served PLMNs currently are available for providing service in the given cell; and
sending a cell information message to a neighboring cell, said cell information message conveying said indicator value, to inform the neighboring cell that the given cell currently has no served PLMNs available.

10. The method of claim 9, wherein the wireless communication network comprises an LTE network, and wherein setting comprises an eNodeB associated with the given cell setting a broadcast PLMN information element (IE) in a cell data update message, and said step of sending comprises the eNodeB transmitting the cell data update message over an X2 interface, to another eNodeB associated with the neighboring cell.

11. The method of claim 9, further comprising:
detecting that at least one served PLMN has become available for use in providing service in the given cell, after a time during which no served PLMNs were available for such use;
setting the indicator to a non-zero value, or another value logically deemed to be non-zero, in response to said detecting served PLMN availability; and
sending another cell information message to the neighboring cell, said another cell information message conveying said indicator value, to inform the neighboring cell that the given cell currently has one or more served PLMNs available.

12. A wireless communication node configured for use in a wireless communication network, said node being configured to indicate the loss of served Public Land Mobile Network (PLMN) availability for a given cell in the wireless communication network, based on including one or more processing circuits that are configured to:
detect that no served PLMNs are available for use in providing service in the given cell;
set an indicator value to zero, or another value logically deemed to be zero, in response to detecting that no served PLMNs currently are available for providing service in the given cell; and
send a cell information message to a neighboring cell, said cell information message conveying said indicator value, to inform the neighboring cell that the given cell currently has no served PLMNs available.

13. The node of claim 12, wherein the wireless communication network comprises an LTE network, and the node comprises an eNodeB associated with the given cell, and wherein that eNodeB is configured to set a broadcast PLMN information element (IE) in a cell data update message, and to transmit the cell data update message over an X2 interface, to another eNodeB associated with the neighboring cell.

14. The node of claim 12, wherein the node is configured to:
detect that at least one served PLMN has become available for use in providing service in the given cell, after a time during which no served PLMNs were available for such use;
set the indicator to a non-zero value, or another value logically deemed to be non-zero, in response to detecting served PLMN availability; and send another cell information message to the neighboring cell, said another cell information message conveying said indicator value, to inform the neighboring cell that the given cell currently has one or more served PLMNs available.

\* \* \* \* \*